United States Patent
Jeong et al.

(10) Patent No.: US 12,345,443 B2
(45) Date of Patent: Jul. 1, 2025

(54) AIR PURIFIER AND AIR PURIFYING METHOD

(71) Applicants: Samsung Electronics Co., Ltd., Suwon-si (KR); IUCF-HYU (Industry-University Cooperation Foundation Hanyang University), Seoul (KR)

(72) Inventors: Joonseon Jeong, Seoul (KR); Ikhyun An, Seoul (KR); Sejin Yook, Seoul (KR); Dongwook Kim, Suwon-si (KR); Jinkyu Kang, Hwaseong-si (KR); Hyun Chul Lee, Hwaseong-si (KR); Hyoungwoo Choi, Hwaseong-si (KR)

(73) Assignees: SAMSUNG ELECTRONICS CO., LTD., Gyeonggi-Do (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 320 days.

(21) Appl. No.: 17/981,684

(22) Filed: Nov. 7, 2022

(65) Prior Publication Data
US 2023/0151983 A1    May 18, 2023

(30) Foreign Application Priority Data
Nov. 15, 2021   (KR) .................. 10-2021-0157101

(51) Int. Cl.
*F24F 8/15*   (2021.01)
*B01D 45/12*   (2006.01)
(Continued)

(52) U.S. Cl.
CPC ............. *F24F 8/15* (2021.01); *B01D 45/12* (2013.01); *B01D 47/00* (2013.01); *B01D 50/00* (2013.01); *F24F 8/95* (2021.01)

(58) Field of Classification Search
CPC ........ B01D 47/00; B01D 50/00; B01D 45/12; F24F 8/15
See application file for complete search history.

(56) References Cited

U.S. PATENT DOCUMENTS 8,702,850 B2    4/2014  Suzuki et al.
2011/0179951 A1   7/2011  Suzuki et al.
(Continued)

FOREIGN PATENT DOCUMENTS

CN   102512928 A  *  6/2012
CN   102688513 A     9/2012
(Continued)

*Primary Examiner* — Robert A Hopkins
(74) *Attorney, Agent, or Firm* — CANTOR COLBURN LLP

(57) ABSTRACT

An air purifier includes an air inlet portion through which polluted air flows in, a plasma reaction portion connected to and in fluid communication with the air inlet portion and including a discharge region generating discharge plasma, a gas-liquid mixing portion connected to and in fluid communication with the plasma reaction portion, and including a gas-liquid mixing portion housing, a droplet spraying device arranged in the gas-liquid mixing portion housing and including at least one spray nozzle spraying fine droplets, and a fluid mixing device which mixes the fine droplets with first purified air transferred from the plasma reaction portion, and a gas-liquid contact portion connected to and in fluid communication with the gas-liquid mixing portion, defining micro-channels through which a gas-liquid mixture fluid transferred from the gas-liquid mixing portion passes, and including an impactor which captures droplets from the gas-liquid mixture fluid.

16 Claims, 13 Drawing Sheets

(51) Int. Cl.
  *B01D 47/00*           (2006.01)
  *B01D 50/00*           (2022.01)
  *F24F 8/95*             (2021.01)

(56) References Cited

U.S. PATENT DOCUMENTS

| | | |
|---|---|---|
| 2017/0028095 A1 | 2/2017 | Ohyama et al. |
| 2017/0232132 A1 | 8/2017 | Deane et al. |
| 2018/0318748 A1 | 11/2018 | Kim et al. |
| 2021/0231324 A1 | 7/2021 | Park et al. |
| 2021/0322917 A1 | 10/2021 | Jeong et al. |
| 2022/0126234 A1 | 4/2022 | Jeong et al. |

FOREIGN PATENT DOCUMENTS

| | | | |
|---|---|---|---|
| FR | 2585969 A1 * | 2/1987 | |
| KR | 20100133718 A | 12/2010 | |
| KR | 20140120328 A | 10/2014 | |
| KR | 101512459 B1 | 4/2015 | |
| KR | 101882283 B1 | 7/2018 | |
| KR | 1020180123389 A | 11/2018 | |
| KR | 1020210097030 A | 8/2021 | |
| KR | 1020210128270 A | 10/2021 | |
| KR | 1020220056021 A | 5/2022 | |
| WO | WO-2010102749 A1 * | 9/2010 | ............. B03C 3/155 |

\* cited by examiner

AIR PURIFIER AND AIR PURIFYING METHOD

This application claims priority to Korean Patent Application No. 10-2021-0157101, filed on Nov. 15, 2021, and all the benefits accruing therefrom under 35 U.S.C. § 119, the content of which in its entirety is herein incorporated by reference.

BACKGROUND

1. Field

Embodiments of the invention relate to air purifiers and air purifying methods for purifying air including fine dust and pollutants.

2. Description of the Related Art

An air purifier purifies air by capturing or decomposing a gas, for example, fine dust or pollutants in the air. An air purifier may be included in industrial dust capturing equipment, air conditioning/ventilation systems in buildings, etc.

Representative methods of removing fine dust and pollutants in the art include a filter method and an adsorption method. In the filter method, fine dust and pollutants from the air are captured by a filter. In the adsorption method, fine dust and pollutants from the air are captured by an activated carbon-based adsorbent having a large predetermined surface area. The filter method and the adsorption method have excellent fine dust and pollutant removal efficiency, and may filter out various types of fine dust and pollutants from the air.

SUMMARY

An increase in the amount of fine dust captured in a filter or an adsorbent may degrade the performance of the filter and the adsorbent and increase the pressure drop in the filter. Thus, there is a difficulty in terms of periodically managing or replacing the filter and the adsorbent.

Provided are air purifiers and air purifying methods, which remove fine dust and pollutants may be removed by a gas-liquid mixture and a gas-liquid contact.

Provided are air purifiers and air purifying methods, which do not desire to periodically replace or maintain a pollutant removing unit.

Provided are air purifiers and air purifying methods, which have improved pollutant removal performance.

Additional features will be set forth in part in the description which follows and, in part, will be apparent from the description, or may be learned by practice of the presented embodiments of the invention.

According to an embodiment of the invention, an air purifier includes an air inlet portion through which polluted air flows in, a plasma reaction portion connected to and in fluid communication with the air inlet portion and including a discharge region generating discharge plasma, a gas-liquid mixing portion connected to and in fluid communication with the plasma reaction portion, and including a gas-liquid mixing portion housing, a droplet spraying device arranged in the gas-liquid mixing portion housing and including at least one spray nozzle spraying fine droplets, and a fluid mixing device which mixes the fine droplets with first purified air transferred from the plasma reaction portion, and a gas-liquid contact portion connected to and in fluid communication with the gas-liquid mixing portion, defining micro-channels through which a gas-liquid mixture fluid transferred from the gas-liquid mixing portion passes, and including an impactor which captures droplets from the gas-liquid mixture fluid.

In an embodiment, the gas-liquid mixing portion and the gas-liquid contact portion may be sequentially arranged in an opposite direction to a gravity direction, and the air purifier may further include a fluid communication portion extending in the gravity direction and arranged between the gas-liquid mixing portion and the gas-liquid contact portion.

In an embodiment, the fluid communication portion may include a vortex finder.

In an embodiment, the at least one spray nozzle may be provided in plural, and a plurality of spray nozzles may be arranged apart from each other at predetermined distances in an upper portion of the gas-liquid mixing portion housing.

In an embodiment, the at least one spray nozzle may be provided in plural, and a plurality of spray nozzles may be arranged apart from each other at predetermined distances in a lower portion of the gas-liquid mixing portion housing.

In an embodiment, the at least one spray nozzle may be provided in plural, and a plurality of spray nozzles may be arranged apart from each other at predetermined distances on a side portion of the gas-liquid mixing portion housing.

In an embodiment, the impactor may include a porous member for capturing the droplets from the gas-liquid mixture fluid.

In an embodiment, the impactor may include a mesh screen arranged on a side surface of the housing and supporting the plurality of fillers.

In an embodiment, a porosity of the porous member may be about 0.5 or more.

In an embodiment, the gas-liquid contact portion may include a gas discharge portion through which an uncaptured gas from among the gas-liquid mixture fluid is discharged, wherein the gas discharge portion may be disposed along a direction different from a gravitational direction.

In an embodiment, the impactor may have one of a polyprism shape or a cylindrical shape.

In an embodiment, the impactor may have one of a square pillar shape or a cylindrical shape.

In an embodiment, a voltage of about 2 kilovolts (kV) to about 500 (kV) may be applied to the discharge region.

In an embodiment, the plasma reaction portion may include a plurality of dielectric particles arranged in the discharge region.

In an embodiment, the air purifier may further include a liquid collecting portion which collects a liquid discharged from the gas-liquid contact portion.

According to an embodiment of the invention, an air purifying method includes allowing polluted air to flow into a plasma reaction portion connected to be in fluid communication with an air inlet portion through which polluted air flows in and comprising a discharge region generating discharge plasma, purifying the polluted air into first purified air by the discharge plasma, generating a gas-liquid mixture fluid by mixing the first purified air with the fine droplets, capturing droplets from a gas-liquid mixture fluid transferred from a gas-liquid mixing portion connected to be in fluid communication with the plasma reaction portion, and discharging the captured liquid in a gravity direction and discharging a purified gas in a direction different from the gravity direction.

In an embodiment, the gas-liquid mixing portion and the gas-liquid contact portion may be sequentially arranged in an opposite direction to the gravity direction, wherein the air purifier further includes a fluid communication portion extending in the gravity direction and arranged between the gas-liquid mixing portion and the gas-liquid contact portion.

In an embodiment, the fluid communication portion may include a vortex finder.

In an embodiment, the air purifying method may further include collecting and purifying a liquid discharged from the gas-liquid contact portion and re-supplying the purified air to the droplet spraying device.

BRIEF DESCRIPTION OF THE DRAWINGS

The above and other features and advantages of predetermined embodiments of the invention will be more apparent from the following description taken in conjunction with the accompanying drawings, in which.

DETAILED DESCRIPTION

Figure 1:
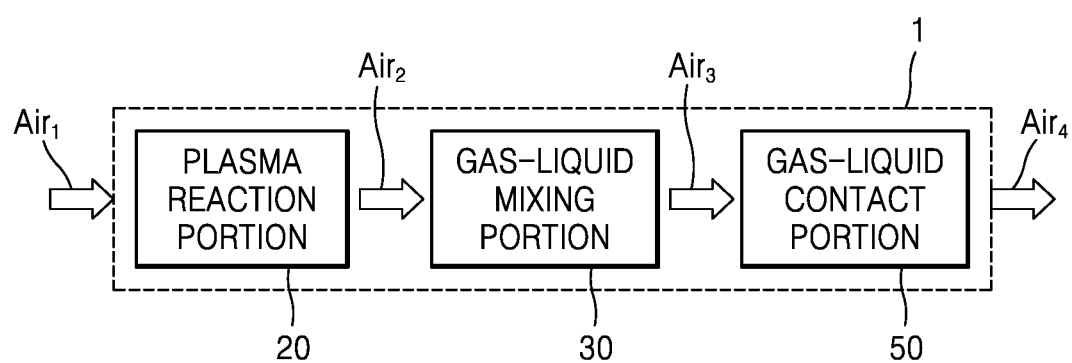
FIG. 1 is a block diagram of an embodiment of an air purifier.

Reference will now be made in detail to embodiments, examples of which are illustrated in the accompanying drawings, in which like reference numerals refer to like elements throughout. In this regard, the embodiments may have different forms and should not be construed as being limited to the descriptions set forth herein. Accordingly, the embodiments are merely described below, by referring to the drawing figures, to explain features. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the disclosure are described in detail with reference to the accompanying drawings. In the drawings, like reference numerals in the drawings denote like elements, and the sizes of elements in the drawings may be exaggerated for clarity and convenience of description.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Figure 2:
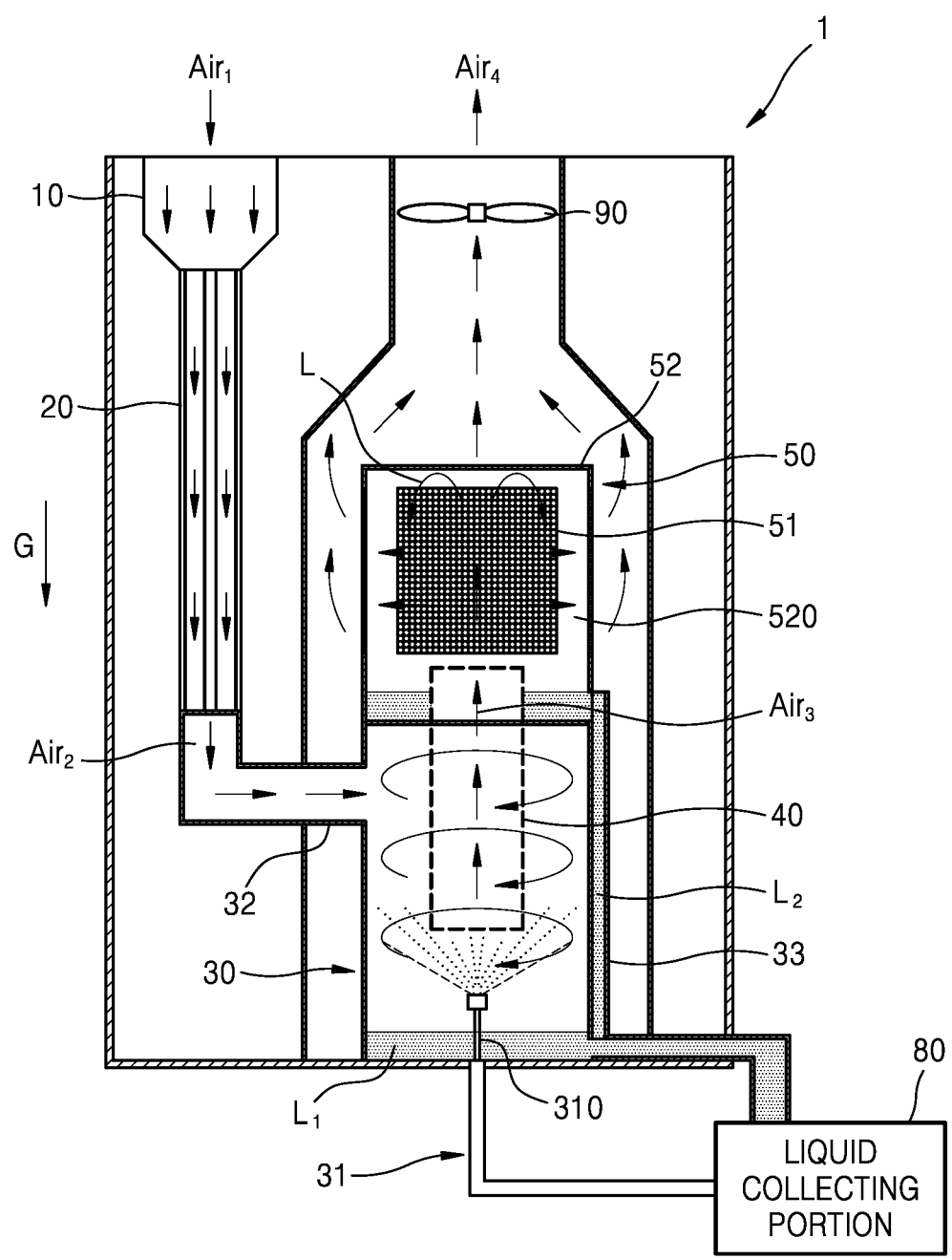
FIG. 2 is a schematic structural diagram of an embodiment of an air purifier.

FIG. 1 is a block diagram of an embodiment of an air purifier. FIG. 2 is a schematic structural diagram of an embodiment of an air purifier.

Referring to FIGS. 1 and 2, an air purifier 1 according to an example may include an air inlet (also referred to as an air inlet portion) 10 through which polluted air $Air_1$ flows in, a plasma reaction portion 20 connected to be in fluid communication with the air inlet 10 and purifying polluted air by discharge plasma, a gas-liquid mixing portion 30 connected to be in fluid communication with the plasma reaction portion 20 and mixing first purified air $Air_2$ with droplets by spraying the droplets, a fluid communication portion 40 arranged between the gas-liquid mixing portion 30 and the gas-liquid contact portion 50, which is described below, and the gas-liquid contact portion 50 capturing droplets included in a gas-liquid mixture fluid $Air_3$ and separating purified gas $Air_4$ and liquid $L_2$ from each other.

In the illustrated embodiment, the plasma reaction portion 20, the gas-liquid mixing portion 30, and the gas-liquid contact portion 50 are sequentially arranged, but the invention is not limited thereto. In the air purifier 1 according to another example, the gas-liquid mixing portion 30, the gas-liquid contact portion 50, and the plasma reaction portion 20 may be sequentially arranged.

According to an example, the gas-liquid mixing portion 30 and the gas-liquid contact portion 50 may be sequentially arranged in a direction opposite to a gravitational direction (also referred to as a gravity direction) G. Here, the fluid communication portion 40 may extend in the gravitational direction G, and may be arranged between the gas-liquid mixing portion 30 and the gas-liquid contact portion 50. The fluid communication portion 40 according to an example may be used as a movement path through which a mixture fluid moves from the gas-liquid mixing portion 30 to the gas-liquid contact portion 50.

In the specification, the polluted air Ain refers to a mixture gas including the air and one or more of fine dust (also referred to as a particulate matter), a water-soluble volatile organic compound ("VOC"), and a water-insoluble VOC. In an embodiment, the fine dust may include small fine dust of about 10 micrometers (μm) or less and ultrafine dust of about 2.5 μm or less. In addition, the water-soluble VOC may include a volatile organic compound, and may include gaseous substances that may be captured in water or aqueous solution to be removed, for example, ammonia ($NH_3$), acetaldehyde ($CH_3CHO$), acetic acid ($CH_3COOH$). In addition, the water-insoluble VOC may include a volatile organic compound that is not captured in water or an aqueous solution, and may include, for example, benzene ($C_6H_6$), formaldehyde ($CH_2O$), toluene ($C_6H_5CH_3$), or the like. However, the invention is not limited thereto, and any gas other than the fine dust, the water-soluble VOC, and the water-insoluble VOC may be included in polluted air $Air_1$. Hereinafter, each of the plasma reaction portion 20, the gas-liquid mixing portion 30, and the gas-liquid contact portion 50, through which the polluted air $Air_1$ passes, will be described in detail.

Figure 3:
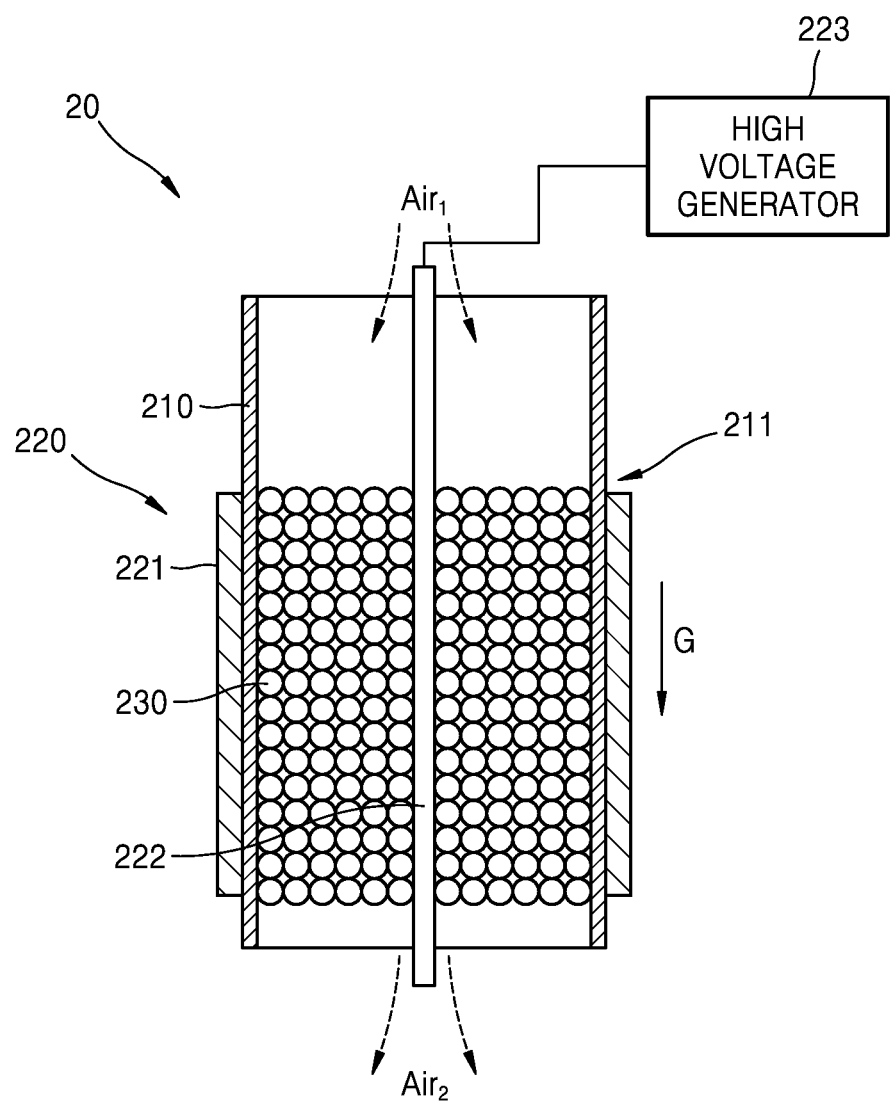
FIG. 3 is an enlarged cross-sectional view of an embodiment of a portion of plasma reaction portion illustrated in FIG. 2.

FIG. 3 is an enlarged cross-sectional view of a portion of the plasma reaction portion 20 illustrated in FIG. 2.

Referring to FIGS. 2 and 3, the plasma reaction portion 20 according to an example may include a reactor 210 that is hollow and extends in one direction, a discharge plasma generator 220 generating a discharge plasma inside the reactor 210, and a plurality of dielectric particles 230 arranged in a packed bed of the reactor 210.

The reactor 210 defines a flow path of the polluted air $Air_1$. In addition, a packed bed 211 in which the plurality of dielectric particles 230 is arranged is provided inside the reactor 210. In an embodiment, the packed bed 211 may be a discharge region in which a discharge plasma is generated using the plasma reaction portion 20. However, the invention is not limited thereto, and another region including the packed bed 211 may be a discharging region.

The reactor 210 according to an example extends in one direction and may have a hollow shape through which the polluted air $Air_1$ and a liquid may flow. In an embodiment, the reactor 210 may be provided as a glass conduit or an aluminum conduit extending in one direction. However, the invention is not limited thereto, and any hollow conduit capable of generating a discharge plasma may be used as the reactor 210.

The discharge plasma generator 220 may include a first electrode 221 arranged on an outer wall of the reactor 210, a second electrode 222 arranged inside the reactor 210, and a high voltage generator 223. The first electrode 221 according to an example may include a ground electrode, and the discharge region in which a discharge plasma may be generated may be surrounded by the first electrode 221. In an embodiment, when the reactor 210 includes a conductor, the first electrode 221 may be integrated with the reactor 210, and when the reactor 210 includes a non-conductor, the first electrode 221 may include a silver paste film and arranged to surround the outer wall of the reactor 210, for example.

In addition, the second electrode 222 may include a power electrode, and may be arranged to be apart from the first electrode 221 with a predetermined interval therebetween in the discharge region where a discharge plasma may be generated. In an embodiment, the second electrode 222 may be provided as a steel wire extending in one direction and arranged inside the reactor 210, for example.

Also, the high voltage generator 223 may apply a high voltage to the discharge region in which a discharge plasma may be generated. The high voltage generator 223 according to an example may include alternating current ("AC") power supply of a sinusoidal waveform and a transformer. The high voltage generator 223 may continuously apply, through the above-described electric system, a high voltage into the reactor 210, for example, to the discharge region in which a discharge plasma may be generated. In an embodiment, a voltage applied to the discharge region may be about 2 kilovolts (kV) or more and about 500 kV or less, and a frequency thereof may be about 10 hertz (Hz) or more and about 1000 Hz or less, but the invention is not limited thereto. In addition, a distance between the first electrode 221 and the second electrode 222 in the discharge region may be about 10 millimeters (mm) or more and about 100 mm or less, and accordingly, an electric field of about 2 kilovolts per centimeter (kV/cm) or more and about 5 kV/cm or less may be applied to the discharge region.

The plurality of dielectric particles 230 may be arranged in the packed bed 211 inside the reactor 210. The plurality of dielectric particles 230 according to an example may be polarized to attract ionized pollutants. In an embodiment, the plurality of dielectric particles 230 may include a dielectric material that may be polarized in the discharge region generated by the discharge plasma generator 220, for example. In an embodiment, the plurality of dielectric particles 230 may include a metal oxide or a metal nitride, for example, at least one of silicon oxide, boron oxide, aluminum oxide, manganese oxide, titanium oxide, barium oxide, copper oxide, magnesium oxide, zinc oxide, zirconium oxide, yttrium oxide, calcium oxide, nickel oxide, iron oxide, or at least one of combinations thereof.

In addition, In an embodiment, the plurality of dielectric particles 230 may form predetermined pores to adjust a period of time that the polluted air $Air_1$ remains in the reactor 210. In an embodiment, the plurality of dielectric particles 230 may have a bead shape having a predetermined particle diameter, for example, an average diameter of about 1 mm or more and about 20 mm or less, for example. However, the invention is not limited thereto, and the plurality of dielectric particles 230 may also have other three-dimensional ("3D") shapes such as an arbitrary cuboid.

In an embodiment, the water-soluble VOC may be directly decomposed using the discharge plasma generator 220. In an embodiment, when a high voltage is applied to the packed bed 211 by the discharge plasma generator 220, the water-soluble VOC may be decomposed using OH radicals (OH·). In an embodiment, when a high voltage is applied to the packed bed 211 by the discharge plasma generator 220, oxygen ($O_2$) and water molecules ($H_2O$) in the air around the second electrode 222 arranged inside the reactor 210 may be broken into a neutral ionized gas state (plasma state), and OH radicals (OH·) may be generated from among these ions. In an embodiment, acetic acid ($CH_3COOH$), acetaldehyde ($CH_3CHO$), and methane ($CH_4$) among the water-soluble VOCs may be decomposed into carbon dioxide ($CO_2$) and water ($H_2O$) as shown in Reaction Formulae 1 to 3 below. Here, carbon dioxide ($CO_2$) and water ($H_2O$), which are products of decomposition, may be discharged out of the reactor 210.

$$CH_3COOH + 4OH + O_2 \rightarrow 2CO_2 + 4H_2O \quad \text{[Reaction Formula 1]}$$

$$CH_3CHO + 6OH + O_2 \rightarrow 2CO_2 + 5H_2O \quad \text{[Reaction Formula 2]}$$

$$CH_4 + 4OH + O_2 \rightarrow CO_2 + 4H_2O \quad \text{[Reaction Formula 3]}$$

Also, In an embodiment, the water-insoluble VOC may be directly decomposed using the discharge plasma generator 220. In an embodiment, when a high voltage is applied to the packed bed 211 by the discharge plasma generator 220, the water-insoluble VOC may be decomposed using OH radicals (OH·). In an embodiment, when a high voltage is applied to the packed bed 211 by the discharge plasma generator 220, oxygen ($O_2$) and water molecules ($H_2O$) in the air surrounding the second electrode 222 arranged inside the reactor 210 may be broken into a neutral ionized gas state (plasma state), and OH radicals (OH·) may be generated from among these ions. In an embodiment, water-soluble organic toluene ($C_6H_5CH_3$) may be decomposed into carbon dioxide ($CO_2$) and water ($H_2O$) by OH radicals (OH·). Here, carbon dioxide ($CO_2$) and water ($H_2O$), which are products of decomposition, may be discharged out of the reactor 210.

Also, in an embodiment, ozone ($O_3$) may be generated from oxygen ($O_2$) in the air by the discharge plasma generator 220. When ozone ($O_3$) is generated inside the reactor 210, the ozone ($O_3$) may be combined with fine droplets to be described later and used as ozone water. However, when a concentration of ozone ($O_3$) generated by the discharge plasma generator 220 exceeds a range that may be used as ozone water, an ozone decomposition catalyst filter (not shown) may be arranged at a rear end of the discharge plasma generator 220 to remove ozone ($O_3$).

As described above, by a decomposition method using the discharge plasma generator 220, the polluted air $Air_1$ that has passed through the reactor 210 may be discharged as the first purified air $Air_2$, from which some pollutants are removed. Here, the first purified air $Air_2$ may include ozone ($O_3$) of a predetermined concentration.

Figure 4A:
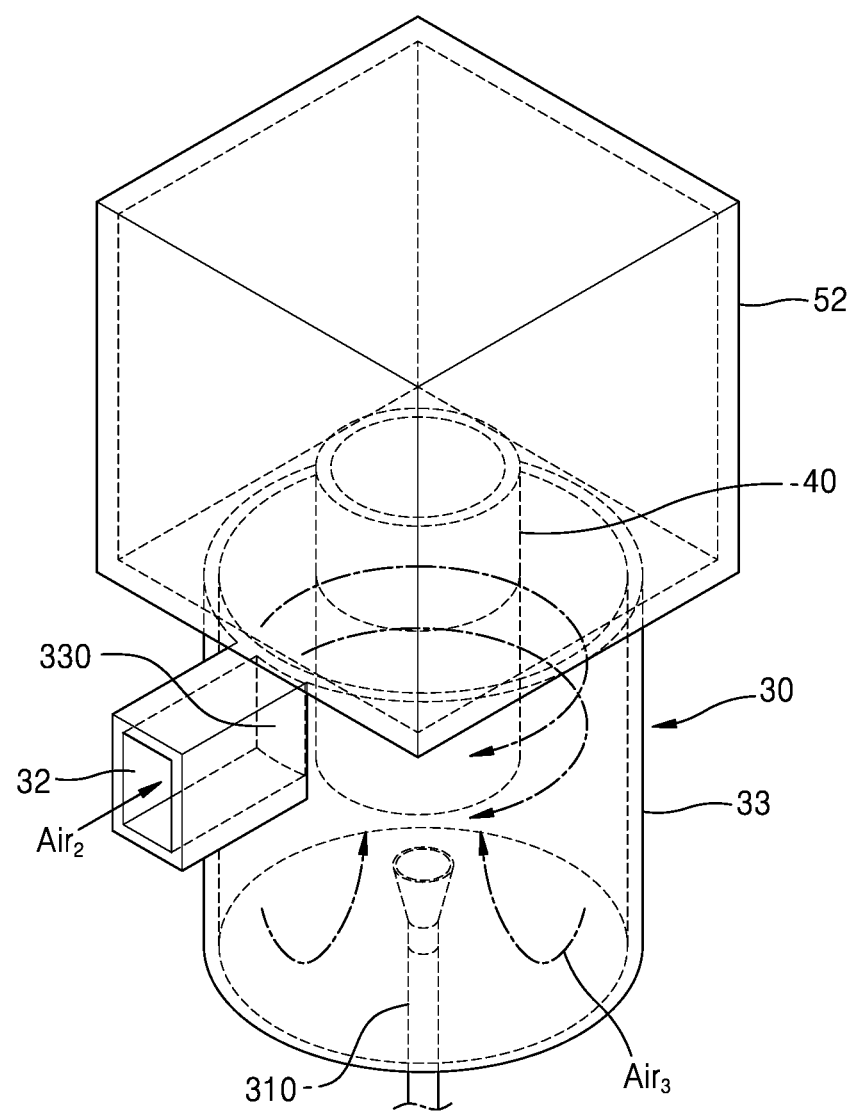
FIG. 4A is a perspective view of an embodiment of a gas-liquid mixing portion and a gas-liquid contact portion.
Figure 4B:
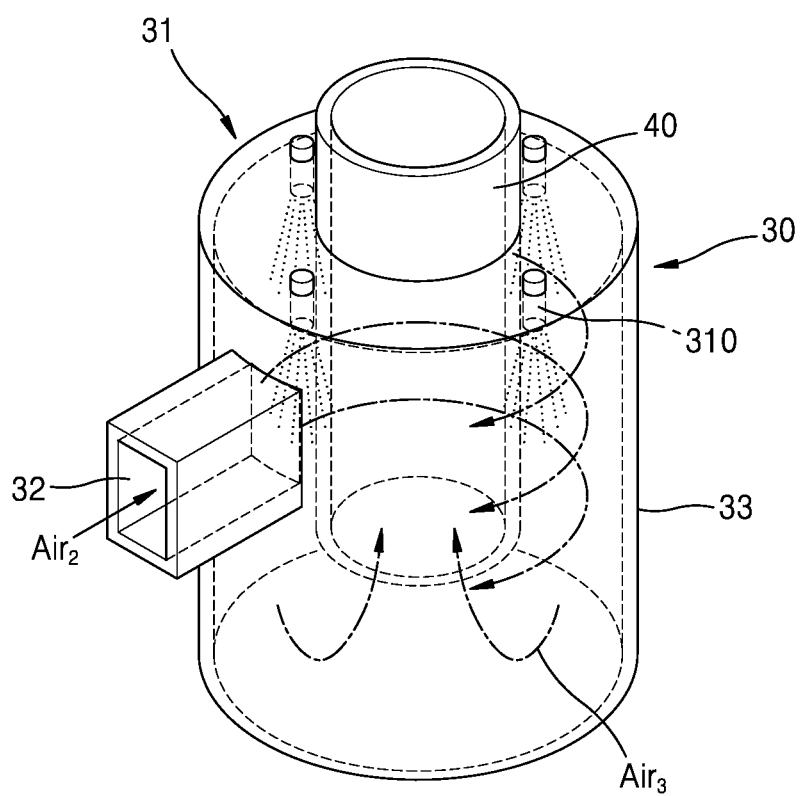
FIG. 4B is a schematic diagram of an embodiment of a gas-liquid mixing portion.
Figure 4C:
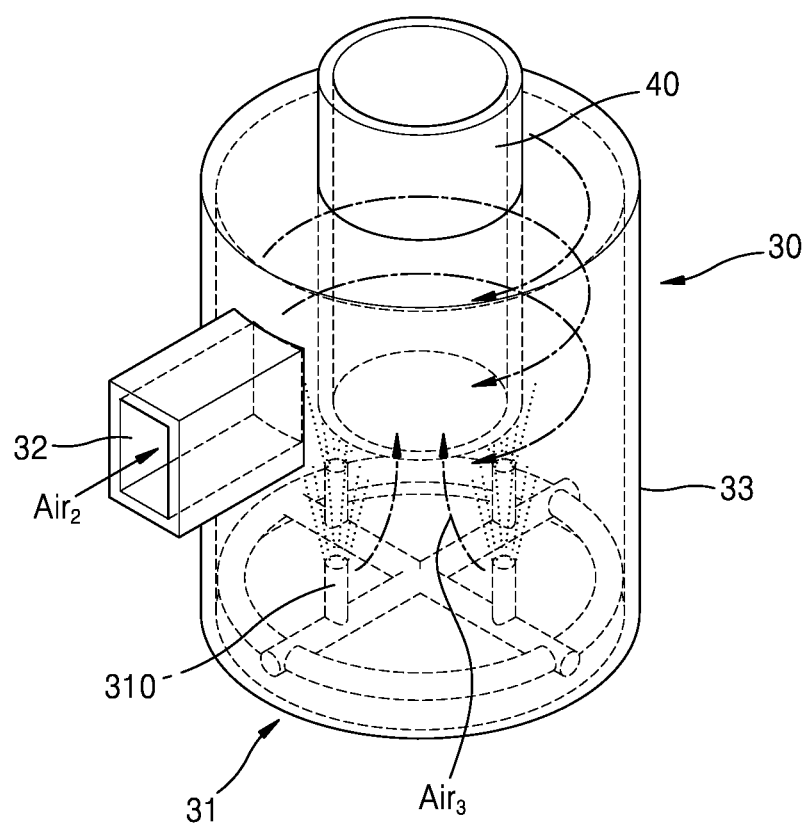
FIG. 4C is a schematic diagram of another embodiment of a gas-liquid mixing portion.
Figure 4D:
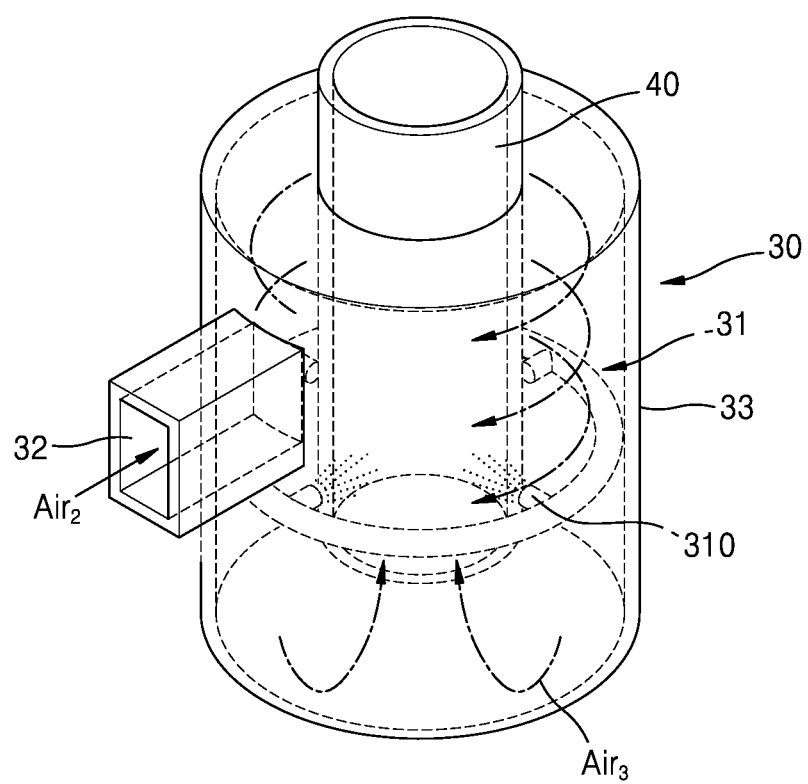
FIG. 4D is a schematic diagram of another embodiment of a gas-liquid mixing portion.

FIG. 4A is a perspective view of a gas-liquid mixing portion and a gas-liquid contact portion, according to an example. FIG. 4B is a schematic diagram of a gas-liquid mixing portion according to an example. FIG. 4C is a schematic diagram of a gas-liquid mixing portion according to another example. FIG. 4D is a schematic diagram of a gas-liquid mixing portion according to another example.

Referring to FIGS. 2 and 4A, the gas-liquid mixing portion 30 according to an example may be connected to be in fluid communication with the plasma reaction portion 20. Accordingly, the first purified air $Air_2$ passing through the plasma reaction portion 20 may be introduced into the gas-liquid mixing portion 30 to be mixed with fine droplets. In an embodiment, the gas-liquid mixing portion 30 may include a droplet spraying device 31 spraying fine droplets, a fluid mixing device 32 mixing fine droplets with the first purified air $Air_2$, and a gas-liquid mixing portion housing 33.

The droplet spraying device 31 may spray droplets, for example, water, into the gas-liquid mixing portion housing 33. The droplet spraying device 31 may include at least one spray nozzle 310. In an embodiment, water stored in a liquid collecting portion 80 is pressurized by a pump (not shown) and sprayed into the gas-liquid mixing portion housing 33 in the form of fine droplets, through the spray nozzle 310, for example. In this process, some of fine dust contained in the first purified air $Air_2$ are captured in the droplets. Accordingly, a gas-liquid mixture fluid in which air and droplets are mixed may be formed or provided in the gas-liquid mixing portion housing 33.

The plurality of spray nozzles 310 included in the droplet spraying device 31 according to an example may be arranged, as illustrated in FIG. 4B, in an upper portion of the gas-liquid mixing portion 30, for example, in an upper portion of the gas-liquid mixing portion housing 33, apart from each other with a predetermined interval therebetween. The plurality of spray nozzles 310 included in the droplet spraying device 31 according to an example may be arranged, as illustrated in FIG. 4C, in a lower portion of the gas-liquid mixing portion 30, for example, in a lower portion of the gas-liquid mixing portion housing 33, apart from each other with a predetermined interval therebetween. The plurality of spray nozzles 310 included in the droplet spraying device 31 according to an example may be arranged, as illustrated in FIG. 4D, on a side portion of the gas-liquid mixing portion 30, for example, on a side portion of the gas-liquid mixing portion housing 33, apart from each other with a predetermined interval therebetween.

As described above, the one or more spray nozzles 310 may be arranged in an arbitrary region of the gas-liquid mixing portion housing 33. Accordingly, the fine droplets passing through the one or more spray nozzles 310 may be sprayed onto the arbitrary region of the gas-liquid mixing portion housing 33. According to an example, the first purified air $Air_2$ that has passed through the plasma reaction portion 20 may be mixed with the fine droplets sprayed to the arbitrary region, to generate the gas-liquid mixture fluid $Air_3$.

In the specification, the gas-liquid mixture fluid $Air_3$ is a fluid in which fine droplets and the first purified air $Air_2$, which has passed through the plasma reaction portion 20, are mixed. In addition, according to an example, when ozone ($O_3$) is included in the first purified air $Air_2$, the gas-liquid mixture fluid $Air_3$ may include ozone ($O_3$) and fine droplets, for example, ozone water in which water droplets are combined. When ozone water is included in the gas-liquid mixture fluid $Air_3$, by the oxidizing power of the ozone water, water pollutants included in the gas-liquid mixture fluid $Air_3$ may be removed and bacteria may be inactivated.

The fluid mixing device 32 may generate a fluid flow for mixing the first purified air $Air_2$ that has passed through the plasma reaction portion 20 and the fine droplets sprayed from the one or more spray nozzles 310. In an embodiment, the fluid mixing device 32 may be a fluid pressurizing device that forms a vortex in the gas-liquid mixing portion housing 33, for example. However, the invention is not limited thereto. In an embodiment, as illustrated in FIG. 2, when the plasma reaction portion 20, the gas-liquid mixing portion 30, and the gas-liquid contact portion 50 are sequentially arranged and movement paths of fluids are connected to each other, a pressure applying portion with respect to each of the plasma reaction portion 20, the gas-liquid mixing portion 30 and the gas-liquid contact portion 50 may be integrated into one. In an embodiment, a pressure member 90 arranged in a discharge path of purified air, for example, a blower, may replace pressure applying portions with respect to the plasma reaction portion 20, the gas-liquid mixing portion 30, and the gas-liquid contact portion 50, for example. The fluid mixing device 32 may not be arranged in the gas-liquid mixing portion 30.

In an embodiment, the first purified air $Air_2$ flowing into the gas-liquid mixing portion housing 33 may form a vortex. In an embodiment, when a pressure is applied to move the first purified air $Air_2$ in a tangential direction of an inlet portion 330 provided in the gas-liquid mixing portion housing 33 as illustrated in FIG. 4A, the first purified air $Air_2$ may rotate at a very high speed along a sidewall of the gas-liquid mixing portion housing 33, for example. Here, fine droplets sprayed from the one or more spray nozzles 310 may also rotate at a very high speed along the sidewall of the gas-liquid mixing portion housing 33, together with the first purified air $Air_2$. In an embodiment, the gas-liquid mixing portion housing 33 may be provided in a cylindrical shape.

According to an example, as the first purified air $Air_2$ and the fine droplets rotate at a very high speed along the side wall of the gas-liquid mixing portion housing 33 by a centrifugal force, a mixing rate of the first purified air $Air_2$ and the fine droplets may be increased. In an embodiment, the first purified air $Air_2$ and the fine droplets sprayed from the one or more spray nozzles 310 may rotate at a very high speed along the sidewall of the gas-liquid mixing portion housing 33, for example. Here, a centrifugal force acts on the first purified air $Air_2$ and the fine droplets, and accordingly, the number of times of contact between the first purified air $Air_2$ and the fine droplets on the side wall of the liquid mixing portion housing 33 may be increased. Accordingly, the gas-liquid mixture gas-fluid $Air_3$ in which the fine droplets and the first purified air $Air_2$ are mixed may be generated easily.

A portion of the gas-liquid mixture fluid $Air_3$ may be combined with another gas-liquid mixture fluid $Air_3$ in a process of downward rotating along the sidewall of the gas-liquid mixing portion housing 33. The gas-liquid mixture fluid $Air_3$ combined with other gas-liquid mixture fluids $Air_3$ and converted to a state of liquid $L_1$ having a predetermined mass or more may be moved to the liquid collecting portion 80.

According to an example, the liquid $L_1$ captured in the liquid collecting portion 80 may include pollutants. In this case, an arbitrary purifier capable of purifying the pollutants captured in the liquid $L_1$ may be arranged in the liquid collecting portion 80. The liquid $L_1$, from which pollutants have been removed by the purifier arranged in the liquid collecting portion 80, may be supplied to the droplet spraying device 31 by a pressure unit such as a pump (not shown) and reused. The gas-liquid mixture fluid $Air_3$ reaching the bottom of the gas-liquid mixing portion housing 33 without being combined with other gas-liquid mixture fluids Air3 may be moved to the gas-liquid contact portion 50 through the fluid communication portion 40.

The fluid communication portion (also referred to as fluid communication unit) 40 may be arranged between the gas-liquid mixing portion 30 and the gas-liquid contact portion 50 to transfer the gas-liquid mixture fluid $Air_3$ generated in the gas-liquid mixing portion 30, to the gas-liquid contact portion 50. In an embodiment, the fluid communication portion 40 may be provided as a hollow conduit extending in the gravitational direction. In an embodiment, when a vortex is formed or provided in the gas-liquid mixing portion housing 33 by the fluid mixing device 32 as described above, the fluid communication portion 40 may be a vortex finder, for example. In an embodiment, when the fluid communication portion 40 is provided as a vortex finder, a pressure drop may occur in an inner region of the bottom of the gas-liquid mixing portion housing 33. Accordingly, the gas-liquid mixture fluid $Air_3$ may rise in a direction opposite to the gravitational direction and be transferred to the gas-liquid contact portion 50.

Figure 5:
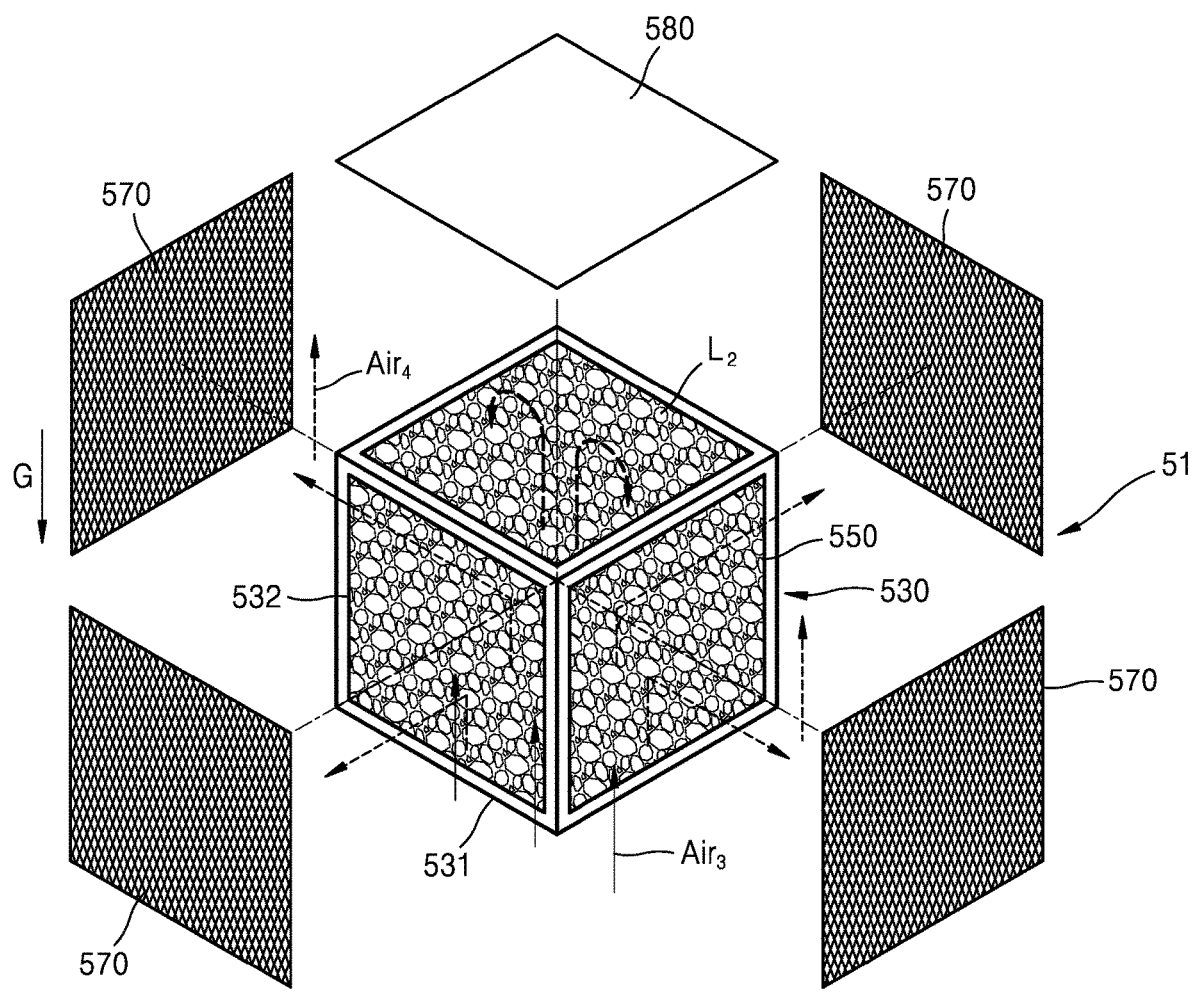
FIG. 5 is a perspective view of an embodiment of an impactor.
Figure 6:
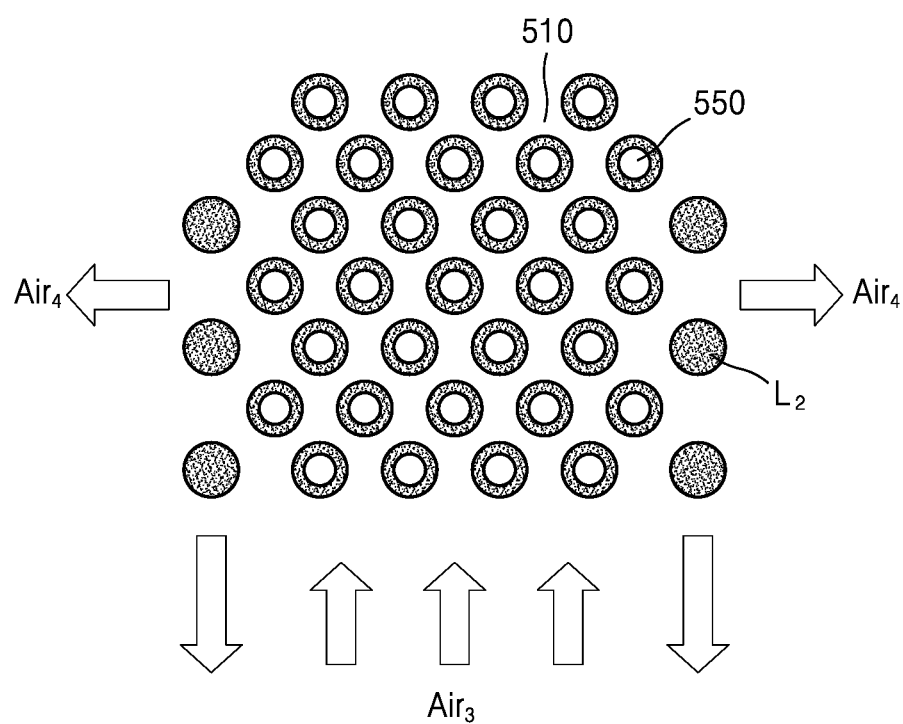
FIG. 6 is a schematic view illustrating an embodiment of a relationship between a liquid and a gas in an impactor.
Figure 7A:
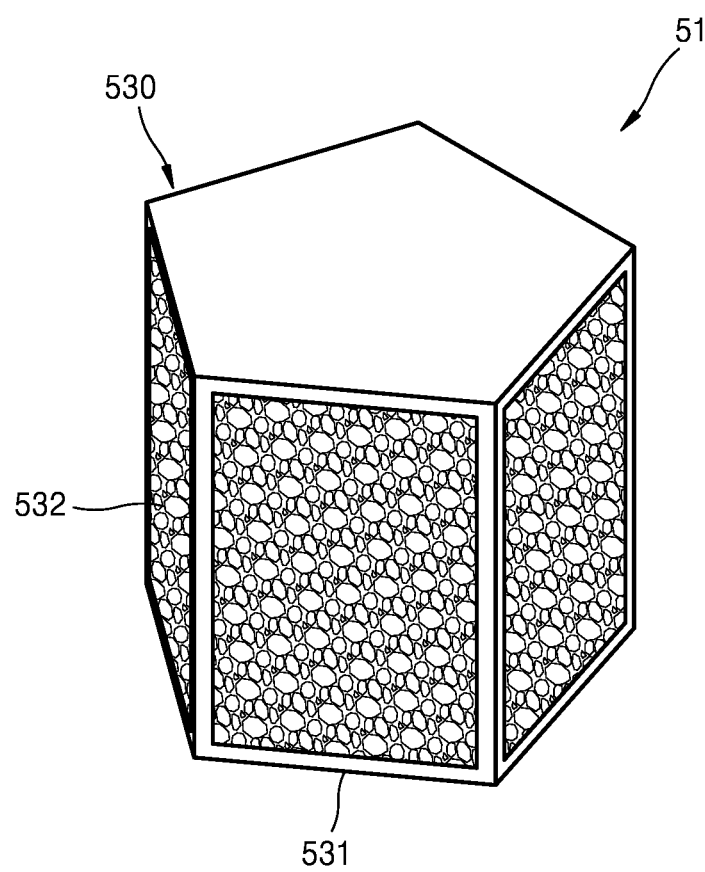
FIG. 7A is a perspective view of an embodiment of an impactor.
Figure 7B:
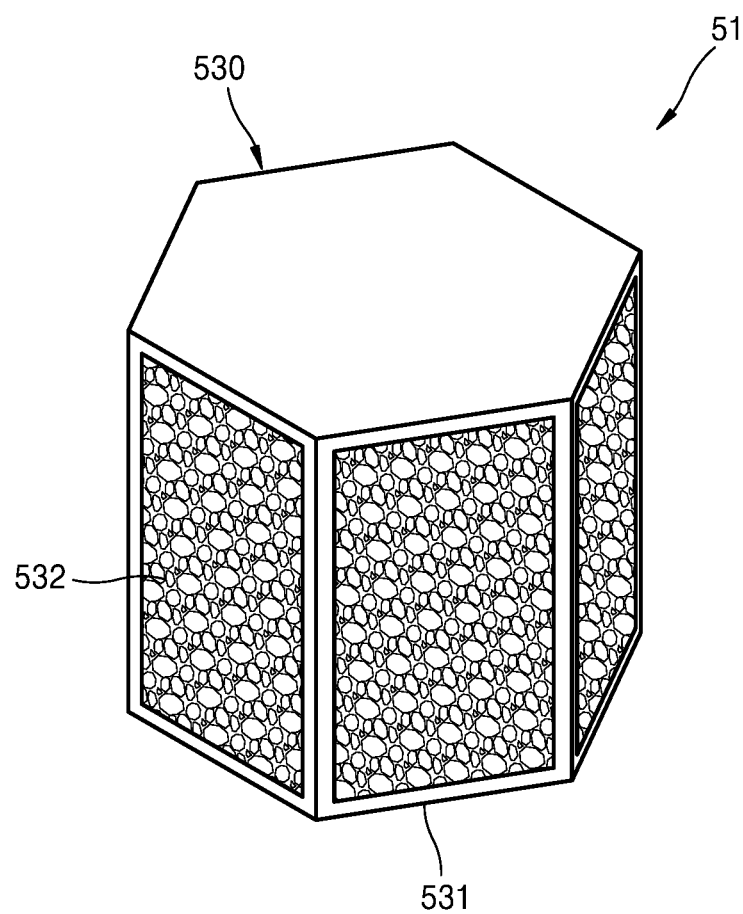
FIG. 7B is a perspective view of an embodiment of an impactor.
Figure 7C:
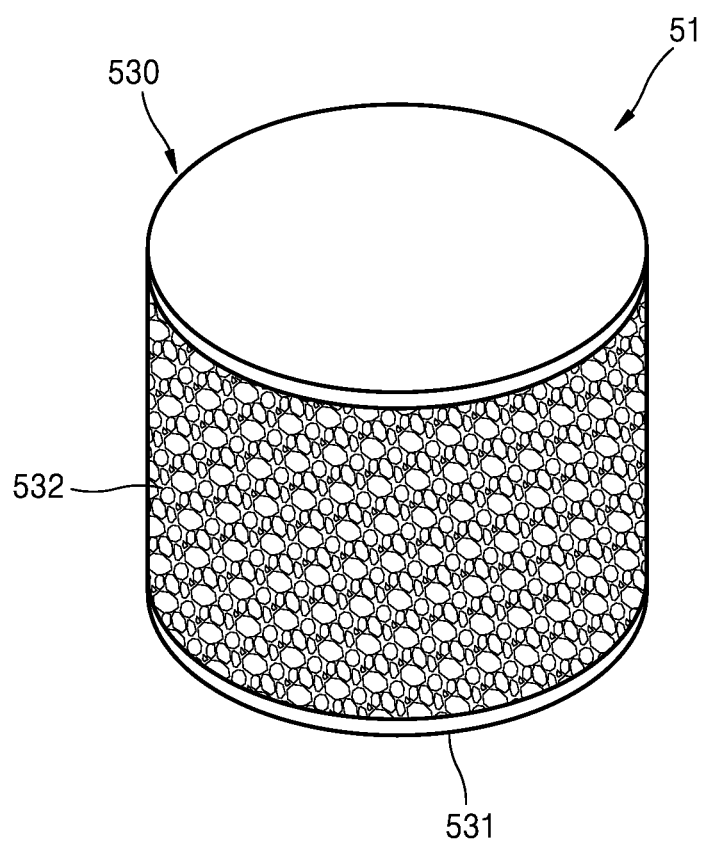
FIG. 7C is a perspective view of an embodiment of an impactor.
Figure 8:
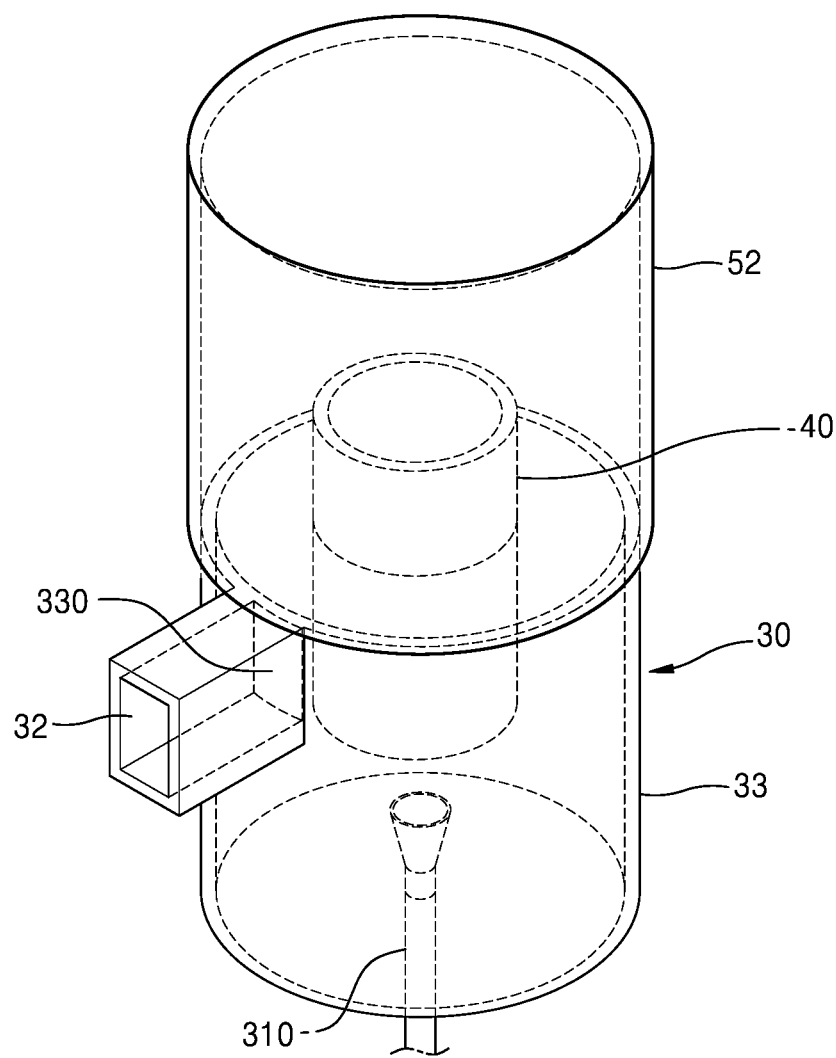
FIG. 8 is a perspective view of an embodiment of a gas-liquid mixing portion and a gas-liquid contact portion.

FIG. 5 is a perspective view of an embodiment of an impactor. FIG. 6 is a schematic view illustrating an embodiment of a relationship between a liquid and a gas in an impactor. FIG. 7A is a perspective view of an embodiment of an impactor. FIG. 7B is a perspective view of an embodiment of an impactor. FIG. 7C is a perspective view of an embodiment of an impactor. FIG. 8 is a perspective view of an embodiment of a gas-liquid mixing portion and a gas-liquid contact portion.

Referring to FIGS. 2, 5 and 6, the gas-liquid contact portion 50 according to an example may be connected to be in fluid communication with the gas-liquid mixing portion 30, and may include an impactor 51 which captures droplets included in the gas-liquid mixture fluid $Air_3$ and a gas-liquid contact portion case 52. In an embodiment, a plurality of micro-channels 510 may be defined in the impactor 51. The gas-liquid mixture fluid $Air_3$ transferred from the gas-liquid mixing portion 30 may pass through the plurality of micro-channels 510. In an embodiment, the gas-liquid contact portion case 52 may include an accommodation member for accommodating the impactor 51. The gas-liquid contact portion case 52 according to an example may be provided in a cube shape as illustrated in FIG. 4A or a cylindrical shape as illustrated in FIG. 8. In the gas-liquid contact portion case 52, a discharge path 520 through which a gas is discharged to the outside, which will be described later, may be arranged.

The impactor 51 according to an example may include a porous member for capturing fine droplets included in the gas-liquid mixture fluid $Air_3$. In an embodiment, the porous member filled in the impactor 51 may be a filling member in which a predetermined void is defined. In an embodiment, the porous member may include one or more of a porous foam block, a fine filler, or a porous mesh screen. In this case, the porosity of the porous member may be about 0.5 or more, for example. The plurality of micro-channels 510 defined in the impactor 51 may be defined by a spacing between porous members. Hereinafter, as a porous member provided in the impactor 51, a fine filler and a porous mesh screen supporting the fine filler are described in an embodiment, but the invention is not limited thereto.

In an embodiment, the impactor 51 may include a housing 530, a plurality of fillers 550 filled in the housing 530, and a mesh screen 570 supporting the plurality of fillers 550. The housing 530 according to an example may be provided in a cuboid frame structure. The plurality of fillers 550 may include, for example, beads. The beads may include, for example, glass, metal, or the like. The diameters of the plurality of beads may be uniform or non-uniform. The plurality of beads may be regularly or irregularly packed inside the housing 530. The plurality of beads may be stacked in one or more layers along a flow direction of the gas-liquid mixture fluid $Air_3$, for example, the gravitational direction G. The micro-channels 510 may be defined by voids between the plurality of beads. A bead according to an example may be a spherical bead as illustrated in FIG. 6. The plurality of beads may have the same diameter. The plurality of beads may be packed in various forms inside the housing 530. The packing form of the plurality of beads may be various as, for example, a cubic structure such as a primitive centered cubic ("PCC") structure, a face centered cubic ("FCC") structure, a body centered cubic ("BCC") structure, and a hexagonal structure such as a hexagonal closed-packed ("HCP") structure, or the like.

According to an example, a surface of the fillers 550 may be treated to have non-affinity with respect to the droplet such droplets may be easily separated from the surface of the fillers 550. In an embodiment, the surface of the fillers 550 may be hydrophobic-treated, for example. To expand a hydrophobic-treated surface area, the surface of the fillers 550 may have a concave-convex shape before hydrophobic treatment.

The housing 530 according to an example may include a fluid inlet portion 531 through which the gas-liquid mixture fluid $Air_3$ is introduced and a liquid $L_2$ is discharged according to the gravitational direction G and a gas discharge portion 532 through which the gas $Air_4$ not captured by the porous member from among the gas-liquid mixture fluid $Air_3$ is discharged. In an embodiment, the fluid inlet portion 531 may be arranged in the gravitational direction G, for example, in a lower surface portion of the housing 530, such that the gas-liquid mixture fluid $Air_3$ is introduced therein and the liquid $L_2$ is discharged therethrough. Here, the gas discharge portion 532 may be arranged in a direction different from the gravitational direction G, for example, in a side surface portion of the housing 530, such that the gas $Air_4$ may be discharged therethrough. An upper surface portion of the housing 530 may be provided as a sealed plate 580 so that the gas-liquid mixture fluid $Air_3$ does not leave the impactor 51. However, the invention is not limited thereto, and the gas discharge portion 532 may also be arranged on the upper surface portion of the housing 530 so that the gas $Air_4$ may be discharged therethrough.

In an embodiment, the impactor 51 may have one of a polyprism shape or a cylindrical shape. In an embodiment, when the impactor 51 has a pentagonal prism shape as illustrated in FIG. 7A, the housing 530 may also have a pentagonal prism shape, for example. Here, the fluid inlet portion 531 may be arranged on the lower surface portion of the housing 530. Also, the gas discharge portion 532 may be arranged on five side surface portions of the housing 530. In addition, when the impactor 51 has a hexagonal prism shape as illustrated in FIG. 7B, the housing 530 may also be provided in a hexagonal prism shape. The fluid inlet portion 531 then may be arranged on the lower surface portion of the housing 530. Also, the gas discharge portion 532 may be arranged on six side surface portions of the housing 530. When the impactor 51 has a pentagonal prism shape as illustrated in FIG. 7C, the housing 530 may also have a cylindrical shape. Here, the fluid inlet portion 531 may be arranged on the lower surface portion of the housing 530. Also, the gas discharge portion 532 may be arranged the side surface portion of the housing 530.

In an embodiment, the mesh screen 570 may be arranged on the gas discharge portion 532. According to an example, the mesh screen 570 may be processed to have non-affinity with respect to the liquid $L_2$. Accordingly, clogging of the pores of the mesh screen 570 due to a liquid may be prevented.

As described above, according to an example, the gas-liquid mixture fluid $Air_3$ transferred from the gas-liquid mixing portion 30 passes through the micro-channels 510 defined by the plurality of fillers 550. In this process, droplets are captured on the surface of the micro-channels 510, that is, on the surface of the fillers 550. The droplets fall in the gravitational direction G. The liquid $L_2$ that has fallen in the gravitational direction G may pass through the mesh screen 570 to be collected in the liquid collecting portion 80.

Here, the gas $Air_4$ that is not captured by the porous member among the gas-liquid mixture fluid $Air_3$ may be discharged through the gas discharge portion (also referred to as a gas discharge unit) 532. Here, the gas $Air_4$ passing through the gas discharge unit 532 may be final purified air that has undergone all purification processes. The purified gas $Air_4$ discharged through the gas discharge portion 532 may be discharged to the outside through the discharge path 520 provided in the gas-liquid contact portion case 52. Here, the pressure member 90, for example, a blower, may apply pressure to the gas $Air_4$ so that the gas $Air_4$ is discharged in a direction opposite to the gravitational direction G.

According to an example, the liquid $L_2$ captured by the liquid collecting portion 80 may include pollutants. Here, an arbitrary purifier capable of purifying the pollutants captured in the liquid $L_2$ may be arranged in the liquid collecting portion 80. The liquid $L_2$, from which pollutants have been removed by the purifier arranged in the liquid collecting portion 80, may be supplied to the droplet spraying device 31 by a pressure unit such as a pump (not shown) and reused.

According to the above-described embodiments of the air purifier and the air purifying method, fine dust and pollutants may be ionized or decomposed by discharge plasma, and captured in a liquid that passes through the gas-liquid mixing portion and the gas-liquid contact portion and then easily discharged from the air purifier. Accordingly, as fine dust and pollutants in the air are easily captured in a liquid and discharged to the outside, excellent pollutant removal performance may be realized.

In addition, the liquid in which fine dust and pollutants are captured is easily discharged from the air purifier, and thus, the burden regarding periodic maintenance or replacement of a pollutant purifying unit such as filters and absorbents may be reduced.

It should be understood that embodiments described herein should be considered in a descriptive sense only and not for purposes of limitation. Descriptions of features or advantages within each embodiment should typically be considered as available for other similar features or advantages in other embodiments. While embodiments have been described with reference to the drawing figures, it will be understood by those of ordinary skill in the art that various changes in form and details may be made therein without departing from the spirit and scope as defined by the following claims.

What is claimed is:

1. An air purifier comprising:
    an air inlet portion through which polluted air flows in;
    a plasma reaction portion connected to and in fluid communication with the air inlet portion and comprising a discharge region generating discharge plasma;
    a gas-liquid mixing portion connected to and in fluid communication with the plasma reaction portion, and comprising a gas-liquid mixing portion housing, a droplet spraying device arranged in the gas-liquid mixing portion housing and including at least one spray nozzle spraying fine droplets, and a fluid mixing device which mixes the fine droplets with first purified air transferred from the plasma reaction portion; and
    a gas-liquid contact portion connected to and in fluid communication with the gas-liquid mixing portion, defining micro-channels through which a gas-liquid mixture fluid transferred from the gas-liquid mixing portion passes, and including an impactor which captures droplets from the gas-liquid mixture fluid, wherein the gas-liquid mixing portion and the gas-liquid contact portion are sequentially arranged in an opposite direction to a gravity direction, wherein the air purifier further comprises a fluid communication portion extending in the gravity direction and arranged between the gas-liquid mixing portion and the gas-liquid contact portion, and wherein the fluid communication portion comprises a vortex finder.

2. The air purifier of claim 1, wherein at least one spray nozzle is provided in plural, and a plurality of spray nozzles is arranged apart from each other at predetermined distances in an upper portion of the gas-liquid mixing portion housing.

3. The air purifier of claim 1, wherein at least one spray nozzle is provided in plural, and a plurality of spray nozzles is arranged apart from each other at predetermined distances in a lower portion of the gas-liquid mixing portion housing.

4. The air purifier of claim 1, wherein at least one spray nozzle is provided in plural, and a plurality of spray nozzles is arranged apart from each other at predetermined distances on a side portion of the gas-liquid mixing portion housing.

5. The air purifier of claim 1, wherein the impactor comprises a porous member for capturing the droplets from the gas-liquid mixture fluid.

6. The air purifier of claim 5, wherein the impactor comprises a housing and a plurality of fillers filled in the housing.

7. The air purifier of claim 6, wherein the impactor comprises a mesh screen arranged on a side surface of the housing and supporting the plurality of fillers.

8. The air purifier of claim 5, wherein a porosity of the porous member is about 0.5 or more.

9. The air purifier of claim 1, wherein the gas-liquid contact portion comprises a gas discharge portion through which an uncaptured gas from among the gas-liquid mixture fluid is discharged, and wherein the gas discharge portion is disposed along a direction different from the gravity direction.

10. The air purifier of claim 1, wherein the impactor has one of a polyprism shape or a cylindrical shape.

11. The air purifier of claim 1, wherein the impactor has one of a square pillar shape or a cylindrical shape.

12. The air purifier of claim 1, wherein a voltage of about 2 kilovolts to about 500 kilovolts is applied to the discharge region.

13. The air purifier of claim 1, wherein the plasma reaction portion comprises a plurality of dielectric particles arranged in the discharge region.

14. The air purifier of claim 1, further comprising a liquid collecting portion which collects a liquid discharged from the gas-liquid contact portion.

15. An air purifying method for purifying polluted air by an air purifier, the air purifying method comprising:

allowing the polluted air to flow into a plasma reaction portion connected to be in fluid communication with an air inlet portion through which polluted air flows in and comprising a discharge region generating discharge plasma;

purifying the polluted air into first purified air by the discharge plasma;

generating a gas-liquid mixture fluid by mixing the first purified air with the fine droplets;

capturing, by a gas-liquid contact portion, droplets from a gas-liquid mixture fluid transferred, via a fluid communication portion, from a gas-liquid mixing portion connected to be in fluid communication with the plasma reaction portion; and discharging the captured liquid in a gravity direction and discharging a purified gas in a direction different from the gravity direction, wherein the gas-liquid mixing portion and the gas-liquid contact portion are sequentially arranged in an opposite direction to the gravity direction, wherein the air purifier further comprises a fluid communication portion extending in the gravity direction and arranged between the gas-liquid mixing portion and the gas-liquid contact portion, and wherein the fluid communication portion comprises a vortex finder.

16. The air purifying method of claim 15, further comprising collecting and purifying a liquid discharged from the gas-liquid contact portion and re-supplying the purified air to a droplet spraying device.

* * * * *